Dec. 24, 1963  F. J. HALLINAN ETAL  3,115,409
PET FOODS AND METHOD OF PACKAGING SAME
Filed May 4, 1959
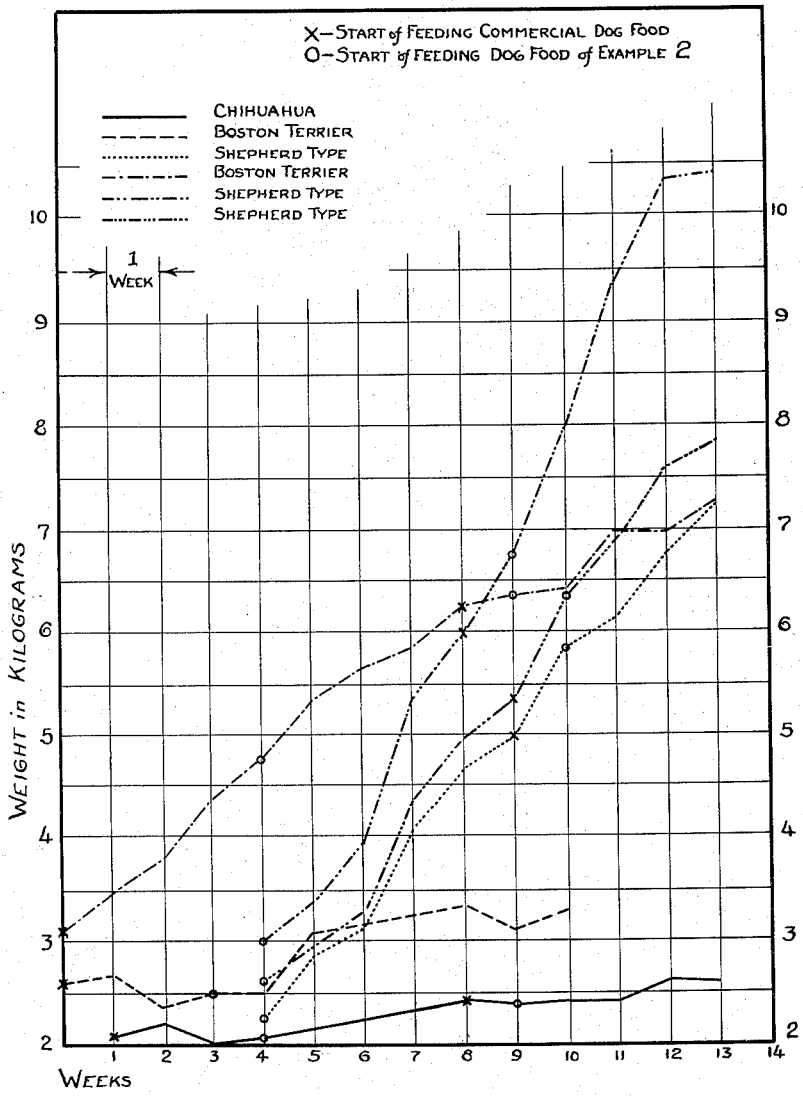

3,115,409
PET FOODS AND METHOD OF
PACKAGING SAME
Francis J. Hallinan, Chicago, Ill., and Edward J. Czarnetzky and Albert I. Coombes, Chazy, N.Y., assignors to Wilson & Co., Inc., a corporation of Delaware
Filed May 4, 1959, Ser. No. 810,867
5 Claims. (Cl. 99—7)

This invention relates to foods of a highly nutritious and palatable character, suitable for animals which eat meaty products, such as minks, dogs and cats. More particularly, the present invention relates to animal foods containing meat, meat by-products, poultry, poultry by-products, fish or other proteinaceous meaty materials or mixtures of such meaty materials and to a method for processing and for packing these foods.

This application is a continuation-in-part of our application Serial No. 351,584, filed April 28, 1953, and entitled Pet Foods and Method of Packaging Same, now abandoned.

In the further description of the invention reference will be made to pet foods but it will be understood that the product of the invention is generally suitable for use as a food for other animals.

Production of a high acid content palatable pet food from proteinaceous meaty material have not been successful heretofore although proper acidity in a pet food has advantages such as the minimizing of the incidence of kidney stones.

Lack of palatability of simple mixtures of proteinaceous meaty materials and acids has been a primary deterrent to acceptance. Another problem faced by prior workers has been limitation to the use of small storage containers which required only a short time for complete retort treatment, which retort treatment is necessary to impart reasonable storage or shelf life. Large containers could not be used because they required such long periods for retort treatment to insure stability during storage that nutritive value of the food was destroyed, the consistency of the mix was reduced from a plastic to a soupy mass and the food objectionably discolored. These prior art packaging methods are not only not practical with containers for appreciable volumes of pet foods but are expensive, time consuming and require careful handling. The prior packaging methods required filling the container with heated product (about 150° F.), sealing the container, further heating the product in the container under pressure at about 220° F. to 250° F., or more for periods of about 1½ to 5 hours or more, and then slowly cooling the container and product for about ½ or 2 hours to create a partial vacuum. When filled glass jars are heated, care must be exercised so that no rapid change in pressure occurs to let the caps blow off or lift and allow the products to get under the seal. Further, after heating, the jars must be slowly cooled under pressure. Even under those circumstances where careful processing has eliminated "leakers" so that pet foods have not been contaminated either through the presence of molds which cause surface deterioration or of bacteria which cause permeating deterioration, conventional pet foods containing proteinaceous meaty material have spoiled rapidly at room temperature and have had a limited keeping time even under refrigeration after the containers have been opened.

In accordance with the present invention, we have produced a high acid content pet food containing proteinaceous meaty material, which has been at least partially altered by the action of hot acid solution. The pet foods of this invention contain proteinaceous meaty material reacted with sufficient edible acid to produce in the final product a pH below about 5 and generally between about 2 and about 5.0. At a pH greater than 5 the hydrogen ion concentration is too low to attain the advantages of the invention and at a pH below about 2.0, the food is not sufficiently palatable for a commercial product and it may be harmful to animals if consumed in large quantities over a prolonged period of time. It is preferred that our complete pet foods also contain grain source items, sugars, added water and food supplements although certain formulas can be made for proteinaceous meaty materials and acid alone to which the non-meat ingredients can be added shortly prior to use.

The pet foods of this invention are non-injurious to animals and excellent with respect to appetite appeal, growth rate and feed efficiency. It has also been shown that our pet foods have no harmful effects on the bone structure or internal organs of animals.

The pet foods of our invention have other advantages. Thus, they may be packaged at relatively low temperatures without extraneous heating of the containers after the food has been sealed therein. As is known, relatively high temperatures and prolonged heating of sealed containers have been necessary in prior art packaging procedures.

The low packaging temperatures of the present invention enable our pet foods to be packaged in containers other than glass or tinned sheet stock, such as coated paper, for example, a type of container discarded as impractical for pet foods of the prior art or in 12 gallon and 55 gallon drums heretofore considered impractical. Pet foods made in accordance with the present invention have remarkable keeping qualities not only in that they avoid decomposition without prolonged heating after packing and sealing but the products have remarkable keeping qualities even after their containers have been opened. Our pet food will keep at normal room temperatures for days, while material is being removed each day, thus enabling a consumer to make full use of a package of food that is only partially used, without need for refrigeration or fear of spoilage. This keeping quality also enables a manufacturer to package the food in larger containers than those that have been used in the past, with consequent savings both to the manufacturer and to the consumer. Our pet foods can be packaged hot in hermetically sealed drums, a packaging medium which could not be used heretofore not only because of size limitations in retorting operations but because the length of time required for heating would destroy the nutritive value of the product and the physical consistency of the end product.

The following general formula illustrates the present invention and shows the ranges of ingredients that may be used as well as the preferred range of ingredients. All percentages are percentages by weight unless otherwise indicated:

|  | Percent | Percent preferred |
| --- | --- | --- |
| Proteinaceous meaty material | 10–99.5 | 14–40 |
| Acids | 0.5–5.0 | 1.5–2.5 |
| Grain source items | 0–35 | 20–30 |
| Sugars | 0–10 | 6–9 |
| Added water | 0–50 | 20–40 |
| Supplements | 0–5 | 0.5–1.5 |
| Analysis: pH | 2.0–5.0 | 3.8–4.7 |

Any edible proteinaceous meaty material may be used in accordance with the present invention. Examples of such materials are: meat of all kinds, e.g., beef, veal, pork, horsemeat and the like; meat by-products such as beef or pork liver, kidney, heart, spleen, tongue trimmings, lungs and skins; poultry such as chicken, turkey, duck or goose; poultry by-products including chicken, turkey, duck or goose offal (heads, feet, viscera); fish of all kinds, and fish by-products, e.g. heads, offal etc. The above proteinaceous meaty materials may be used alone or in various admixtures. Ground edible bone or bone meal and solubilized bone protein may also be employed, preferably in smaller quantities than the above mentioned proteinaceous meaty materials and preferably in admixture with said proteinaceous meaty materials. Similarly, fats and tallow which are found in said proteinaceous meaty materials may be used with, or added to, said proteinaceous meaty materials, preferably in small quantities. The term "proteinaceous meaty materials" as used herein is meant to refer to the products as above described.

Any edible acid or acid-containing substance may be employed to adjust the $H^+$ ion concentration to the desired pH. Examples of suitable pH adjusters are feed grade whey, lactic acid, citric acid, acetic acid, tartaric acid, hydrochloric acid, sulfuric acid, phosphoric acid and acid salts such as monobasic sodium phosphate. Utilization of only inorganic acids in the preparation of pet foods requires careful selection of ingredients to attain nutritive balance. Mixtures of organic acids with inorganic acids, for example, mixtures of acetic acid, lactic acid, tartaric acid, etc. with phosphoric acid, sulfuric acid, hydrochloric acid and the like are favored because of less stringent requirements for nutritive balance and because they provide in the animal system a proper acid-base balance and assist in maintaining a proper mineral balance for adequate bone growth.

When preparing a complete food, as distinguished from foods that merely provide the meaty portion of a diet, edible grain source items of all types may be used in the formulations of our invention. Thus, grains and cereal products such as oats, rolled oats, wheat, wheat germ, soy grits, corn and dried brewer's grains may be used singly or in various admixtures. Vegetable oils, soybean lecithin, soybeam oilmeal and other grain processing by-products are also suitable.

Dissolved edible sugars contribute to the initial destruction of micro-organisms in processing and help inhibit growth of surviving organisms and may be added to the pet foods of our invention, thereby further enhancing its keeping qualities. Examples of suitable edible sugars are cane sugar, lactose, corn sugar, dextrose and the like. The sugar may also be added in the form of cane or corn syrup, molasses, malt syrup, etc.

The moisture content of the pet foods of our invention may be varied rather widely, as desired. The pet food may be manufactured with a conventional moisture content of about 65–75% by adding the necessary additional amount of water to the other ingredients. Water is not added to the ingredients if a condensed pet food having a moisture content of about 30–40% is desired. A condensed pet food is advantageous in that an equivalent amount of food may be packaged in smaller containers and the reduced moisture content of the condensed pet food also enhances the keeping qualities of the food.

Suitable food supplements may be supplied in the formulations to add to the nutritional value of the food, if desired. For example, amino acids, vitamins, minerals, lecithin, sodium nitrite, iron oxide, cod liver oil and the like food supplements may be added to the formulations. There may also be added antioxidants such as propyl gallate and flavoring materials such as garlic, onion, salt and the like.

Pet foods manufactured in accordance with the present invention are processed in a novel manner and the packaging of the processed food involves a relatively simple and inexpensive operation. The pet foods of this invention are prepared by adding to the solid ingredients sufficient edible acid to produce a strongly acidified proteinaceous mixture. The added quantity of acid may be sufficient to produce a pH in the final cooked product of between about 2.0 and about 5.0 or it may be only sufficient to produce a desired initial pH of about 4.5 to 5.0 for initiation of cooking with the intention that the pH be adjusted one or more times during the cooking operation to maintain the pH within the proper range and to assure a proper final acidity.

Acidified material is precooked by heating at relatively low temperatures in the range between about 140° F. and the boiling temperature of the mixture, usually about 213° F. to effect pasteurizing, and/or sterilizing, as well as to effect acid-cook alteration of the proteinaceous material. Preferably the cooking is carried out at temperatures between about 180° F. and 212° F., when atmospheric pressure conditions are maintained. Acid cooking in the absence of any substantial amounts of added free water, produces alteration in the physical condition of the proteinaceous material evidenced by freeing of water and fat and in the chemical condition as evidenced by final pH which is dependent upon relative proportions of protein, bone and acid.

Cooking time is necessarily variable, depending upon food composition, cooking temperature and pressure conditions being maintained in the cooking kettle. In general cooking requires between about 5 and about 90 minutes. At temperatures in the range of about 180° F. to 212° F., a short period of time of the order of about 10 to 15 minutes is required.

In cooking a complete pet food, the proteinaceous meaty portion of the composition may be mixed with non-meat ingredients, i.e., grains, sugars, etc., and the complete mixture subjected to the conditions for acid-cook alteration of the proteinaceous meaty material. Alternatively, the proteinaceous meaty material may be separately subjected to at least partial alteration by acid cooking, the non-meat ingredients mixed with the altered proteinaceous material and the mixture given a short heat treatment, i.e., at least pasteurizing treatment while maintaining a proper pH, before packaging.

The precooked pet food resulting from the acid-cook alteration of proteinaceous meaty material is packaged, while still hot, for storage and sale. This precooked pet food is maintained at a temperature about 140° F., while containers are being filled. The heated product may be introduced into the container, in quantities to substantially fill or stuff the container so that upon closing there are no air pockets or voids and there is little or no empty "head space" but such complete filling of containers is not necessary. The container is then sealed and inverted or otherwise manipulated to assure contact of the hot product with all the inner surfaces of the container, following which the sealed container is cooled to bring the temperature of the product to below about 100° F.

A rather wide variety of containers may be employed in the packaging process of our invention. Any can, jar, bag, box or other type of container which can be sealed sufficiently tight to prevent the entrance of microorganisms, will retain water vapor, will not leak fat and which will resist attack by the water, acid and fat present in the pet food is satisfactory. Thus, even waxed paper containers, plastic bags and the like may be employed in packaging our pet food because of the low packaging temperatures employed. Containers of this type could not be satisfactorily used with prior art pet foods.

A container which has proven satisfactory in the packaging of a conventional moisture content dog food of our invention is one made from paper tubes coated with a polyvinylidene chloride latex emulsion. Any flexible, all plastic bag having the above mentioned characteristics is a suitable container for condensed pet foods made in accordance with the present invention. Of course, conventional tins or jars may also be employed, if desired.

The following are illustrative examples of the pet foods of our invention and the method of packaging same.

EXAMPLE I

A pet food of conventional moisture content was made from the following ingredients.

| Ingredients: | Percent by weight |
|---|---|
| Water | 43.14 |
| Ground, cooked pork skins | 30.00 |
| Steamed bone meal | 1.00 |
| Lactic acid | 2.50 |
| Cracked barley | 13.50 |
| Soy grits | 5.50 |
| Wheat germ | 3.00 |
| Food supplements and flavoring (vitamins, cod liver oil, iron oxide, onion powder, etc.) | 1.36 |

All of the ingredients except the grain source items (cracked barley, soy grits and wheat germ) were placed in a steamed jacketed mixer which was run for fifteen seconds. The mixer was then turned off, but the ingredients were heated until the contents came to a boil. The grain source items were then added and the mixture was agitated for periods of fifteen seconds at three minute intervals (to prevent scorching) until the temperature reached 200° F.

The heated product was then tightly packed in a paper container coated with a polyvinylidene chloride film, care being taken that there were no air pockets in the container. The container was then sealed. There was a small empty head space between the product and the container cover. The temperature of the product at the time of sealing was 180° F.

The container was then inverted so that the heated product came in contact with all of the inner surfaces of the container and the container and its contents were then allowed to cool to room temperature.

The resulting product had a pH of about 4.0 and samples of the product which were opened a year after packaging had the same pH. The pet food was nutritious and appetizing to animals. Results of tests made with this pet food and pet foods of similar formulations are given below.

EXAMPLE II

A palatable pet food containing proteinaceous meaty material was made from the following ingredients.

| Ingredients: | Percent by weight |
|---|---|
| Ground pork gullets | 60 |
| Ground sheep lungs | 35.99 |
| Steamed bone meal | 1.00 |
| Phosphoric acid | 3.00 |
| Iron oxide | .01 |
| | 100.00 |

Ground lungs and gullet were delivered to a steel jacketed kettle. While the kettle contents were kept agitated, the other enumerated ingredients were added to the kettle. The mixture having an initial pH of about 3.8 was heated until the temperature was brought to 212° F. while maintaining continuous agitation to prevent scorching. The mixture was held at 212° F. for about 60 minutes. During heating some water was vaporized. Acid reaction with the proteinaceous material brought about a freeing of some water and some fat. Fat was removed from the kettle.

Upon completion of the heating, additional phosphoric acid may be added to adjust the pH of the material to 3.2. At this time water may be added to adjust the solids content of the proteinaceous meaty material to about 35%.

Upon cooling to 180° F., the cooked proteinaceous meaty material is packed in containers such as 12 gallon pails or 55 gallon drums, the containers sealed and manipulated so that hot acid product comes in contact with all interior surfaces. The containers are then allowed to cool. If the proteinaceous meaty material is to be mixed with non-meat ingredients by the user for the feeding of mink, the pH of the cooked proteinaceous meaty product may be as low as 1.

EXAMPLE III

A condensed pet food was prepared from the following ingredients.

| Ingredients: | Percent by weight |
|---|---|
| Ground cooked pork skins | 14.00 |
| Beef tallow | 7.00 |
| Solubilized bone protein concentrate (50% solids) | 5.00 |
| Steamed bone meal | 1.00 |
| Lactic acid (85%) | 1.40 |
| Whey (27% solids, feed grade) | 31.00 |
| Molasses | 3.00 |
| Soybean oilmeal | 13.10 |
| Wheat germ | 7.85 |
| Rolled oats | 7.00 |
| Dried brewers' grains | 5.00 |
| Supplements and flavoring (lecithin, vitamins, cod liver oil, iron oxide, onion powder, etc.) | 4.65 |

All of the ingredients with the exception of the soybean oilmeal, wheat germ and rolled oats were placed in a covered steam-jacketed mixer and brought to a boil with slight agitation. The soybean oilmeal, wheat germ and rolled oats were then added and the batch was heated to 200° F., with sufficient intermittent mixing to prevent scorching, and held at this temperature for fifteen minutes.

EXAMPLE IV

A pet food of conventional moisture content was made from the following ingredients.

| Ingredients: | Percent by weight |
|---|---|
| Water | 43.14 |
| Ground pork lungs | 20.00 |
| Ground pork gullets | 10.00 |
| Steamed bone meal | 1.00 |
| Lactic acid | 2.00 |
| Phosphoric acid | 1.00 |
| Cracked barley | 13.50 |
| Soy grits | 5.50 |
| Wheat germ | 3.00 |
| Food supplements and flavoring (vitamins, cod liver oil, iron oxide, onion powder, etc.) | 1.36 |

All of the ingredients except the grain source items (cracked barley, soy grits and wheat germ) were placed in a steam jacketed mixer which was run for fifteen seconds. The mixer was then turned off, but the ingredients were heated until the contents came to a boil. The grain source items were then added and the mixture was agitated for periods of fifteen seconds at three minute intervals (to prevent scorching) until the temperature reached 200° F.

The heated product was then packed in 12 and 55 gallon drums leaving a head space of about ½ to 1 inch and the container drums closed with a gasketed cover. The temperature of the product at the time of sealing was approximately 180° F.

The container was then inverted so that the heated product came in contact with the free space of the container above the filling level and the inner surface of the drum cover. The drum contents were then allowed to cool to room temperature. The cooled complete pet food had a consistency upon cooling of a paste which is plastic and non-flowing but can be made to flow under pressure.

Heated products of Examples II and III were also packaged in flexible containers. Complete cooked pet food was placed in a conventional extrusion device and extruded into polyvinylidene chloride (Saran) bags. On testing, the product of Examples II and III which showed a pH of 4.5 and 4.3 respectively, had excellent keeping qualities.

A number of tests were made with the products of Examples I and III as well as other products which were similar to the products of Examples I and III except for minor changes in supplements, flavoring and the like.

The keeping qualities of the pet foods prepared in accordance with the present invention are excellent. Quantities of each food of the examples were packaged and tested in various manners. Samples of food were stored and tested five months and one year after packaging and showed no evidence of bacterial spoilage. In some cases, where packages were broken or leaky, there was mold formation on the surface of the food, but this mold formation did not affect the quality of the food for the mold was confined to the surface. After scraping the mold from the surface, the mold-free product was fed to dogs and rats and no ill effects were observed on the animals.

Numerous bacteriological tests were made on 67 packages of pet food made as described in Examples I and III. The packages were tested at room temperature, and incubated at 37° C. and 55° C. for periods between 1 and 44 days. No bacterial growth or mold formation was observable. In some cases, a surface mold growth did form when the packages were split or torn, but this did not adversely affect the food quality.

Rat feeding tests were conducted using Sprague-Dawley strain male rats that were 21 days old at the start of the experiments. Food and water were available at all times and food consumption was recorded daily. The weight of the rats was recorded weekly. The following table shows the results of such tests.

*Rat Feeding Tests*

| Test No. | No. of Rats in Group | Growth Rate | Feed Efficiency | Type of Food [1] | Comments |
| --- | --- | --- | --- | --- | --- |
| 1 | 26 | 3.7 | | 2 | Test run only 4 weeks. |
| 2 | 26 | 4.4 | | 2 | |
| 3 | 39 | 4.9 | 2.2 | 2 | |
| 4 | 33 | 4.6 | 2.4 | 2 | |
| 5 | 25 | 5.0 | 2.5 | 2 | All grain ration first five days. |
| 6 | 25 | 5.3 | 2.3 | 2 | |
| 7 | 16 | 4.2 | | 2 | |
| 8 | 16 | 4.5 | | 2 | |
| 9 | 16 | 4.6 | | 2 | |
| 10 | 16 | 4.9 | | 2 | |
| 11 | 16 | 5.3 | | 1 | |
| 12 | 5 | 3.8 | | 2 | |
| 13 | 5 | 4.4 | | 2 | |
| 14 | 25 | 5.4 | 2.6 | 1 | |
| 15 | 25 | 4.3 | 2.4 | 1 | |
| 16 | 10 | 4.3 | 1.8 | 1 | |
| 17 | 15 | 5.0 | 1.8 | 1 | |

[1] The number 1 refers to the food of Example I and the number 2 to the food of Example II. In some cases minor changes were made in the proportions of ingredients, particularly with regard to the food supplement, but in all cases the food was substantially identical with that of the examples.

In the table, the growth rate indicates the number of grams of weight gained by each rat per day and was calculated on the basis of an average of all the rats for a period of 6 weeks. The feed efficiency refers to the number of grams of food on a dry basis required for each gram of weight gained by a rat per day and was calculated by averaging the feed efficiency of all the rats in a group for a period of 6 weeks.

Controls were also run using a commercial type dog food comprising approximately 30% proteinaceous meaty material, 44% water, 24% grain source items, 2% food supplements and flavoring. The control was a commercial dog food understood by those in the art to be a complete, well balanced ration. The pet foods of the present invention gave growth rate and other results fully comparable to those of the controls. A growth rate over 3.0 and feed efficiency under 3.0 should be obtained in a complete and well balanced pet food and this was accomplished with the pet foods of our invention.

In addition to the rat feeding tests, other observations were made on rats. X-ray pictures of rat bone structure, examination of the internal organs of the various rats, fluoroscopic examination of bone structure and physical examination of the rats all indicated that our pet foods have no harmful effect on the bone structure or the internal organs of the rats.

Tests were conducted with dogs of different breeds ranging in size from chihuahuas to shepherds. In most cases, the dogs were fed the pet foods of our invention just after weaning and were maintained on these foods during the fast growing period. In some cases, tests were conducted with mature dogs.

The accompanying drawing illustrates the growth rate of dogs which were fed, alternately, the pet food of Example III of our invention and a control dog food of the type above described in connection with the rat feeding tests. It is manifest from an examination of the graph shown in the drawing that the growth rate of dogs fed the dog food of our invention compares favorably with the commercially acceptable dog food. In all cases, dogs fed the pet food of our invention appeared healthy and had good appetites and the growth of the dogs as well as their feed efficiency was excellent for the breed of dog used and for the portion of the growing period used in the tests.

Additional observations were made on dogs. X-ray pictures were taken of two dogs who were fed the pet food of our invention exclusively for 17 weeks. Post-mortem examinations were made on two dogs who were fed our pet food exclusively for 20 weeks. Additionally, observations were made on physical appearance, satiety and appetite appeal of our pet food as compared with the commercial dog food. Results of all these tests indicate that the pet food of the present invention has high appetite appeal, is healthful and causes no harmful effects to the bone structure or internal organs of dogs.

Similar tests were made on cats and the results were again satisfactory.

In order to determine whether or not our pet food would be harmful if eaten by humans, the pet food was also fed to monkeys and the monkeys were tested for toxicity. No harmful effects were observed. At times, the pet food of our invention was eaten by monkeys in preference to bananas and grapes, which are among their normal food items.

It is manifest that changes may be made in the formulations of pet foods made in accordance with the present invention as well as in the method of packaging the foods without departing from the spirit or scope of the invention. The examples furnished are intended to be illustrative, rather than restrictive, and our invention is to be limited only by the scope of the appended claims.

We claim:

1. The method of preparing and packaging an animal food comprising initially adjusting the pH of a food containing proteinaceous meaty material to between about 2.0 and 5.0, heating the food to between about 140° F. and the boiling temperature of the acidified material whereby proteinaceous material is altered by reaction with acid and during the heating period maintaining a pH below 4.7, tightly stuffing the heated food in a container, sealing the container, and then cooling the container, to obtain a palatable and nutritious food having a pH between about 3.8 and 4.7 and ready for consumption without cooking.

2. The method of preparing and packaging an animal food comprising adjusting the pH of a food containing proteinaceous meaty material to between about 2.0 and 5.0, heating the food to between about 140° F. and the boiling temperature of the acidified material whereby proteinaceous material is altered by reaction with acid and during the heating period maintaining a pH below 4.7, stuffing the heated food in a container, sealing the container, manipulating the container so that the food comes in contact with all of the interior surfaces of the container, and then cooling the container, to obtain a palatable and nutritious food having a pH between about 3.8 and 4.7 and ready for consumption without cooking.

3. The method of preparing and packaging an animal food comprising adjusting the pH of a food containing proteinaceous meaty material to between about 3.8 and 4.7, heating the food to about 180° F. whereby proteinaceous material is altered by reaction with acid and during the heating period maintaining a pH below 4.7, stuffing the heated food in a container, sealing the container, manipulating the container so that the food comes in contact with all of the interior surfaces of the container, and then cooling the container, to obtain a palatable and nutritious food having a pH between about 3.8 and 4.7 and ready for consumption without cooking.

4. The method of preparing and packaging an animal food comprising 10 to 99.5% proteinaceous meaty material, 0 to 35% grain source items, 0 to 10% sugar, 0 to 50% added water and 0 to 5% food supplements, said method comprising adjusting the pH of said food to between about 2.0 and 5.0, heating the food to between about 140° to 200° F. whereby proteinaceous material is altered by reaction with acid and during the heating period maintaining a pH below 5, stuffing the heated food in a container, sealing the container, manipulating the container so that the food comes in contact with all of the interior surfaces of the container, and then cooling the container, to obtain a palatable and nutritious food having a pH between about 2.0 and 5.0 and ready for consumption without cooking.

5. The method of preparing and packaging an animal food comprising 14 to 40% proteinaceous meaty material, 20 to 30% grain source items, 6 to 9% sugar, 20 to 40% added water and 0.5 to 1.5% food supplements, said method comprising adjusting the pH of said food to between about 3.8 and 4.7, heating the food to between about 140° to 200° F. whereby proteinaceous material is altered by reaction with acid and during the heating period maintaining a pH below 4.7, stuffing the heated food in a container, sealing the container, manipulating the container so that the food comes in contact with all of the interior surfaces of the container, and then cooling the container, to obtain a palatable and nutritious food having a pH between about 3.8 and 4.7 and ready for consumption without cooking.

References Cited in the file of this patent

UNITED STATES PATENTS

| | | |
|---|---|---|
| 1,777,795 | Hansen | Oct. 7, 1930 |
| 2,434,388 | Brehm | Jan. 13, 1948 |
| 2,627,473 | Brissey | Feb. 3, 1953 |

OTHER REFERENCES

Rideal: Disinfection and Preservation of Food, 3rd ed. (1903), John Wiley & Sons, N.Y.C., pp. 419–421. (Copy in Div. 63.)